R. D. STEVENSON.
TURNBUCKLE.
APPLICATION FILED MAR. 15, 1918.
1,374,963.
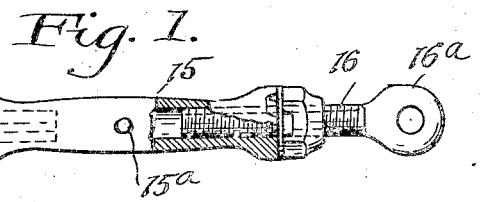
Patented Apr. 19, 1921.
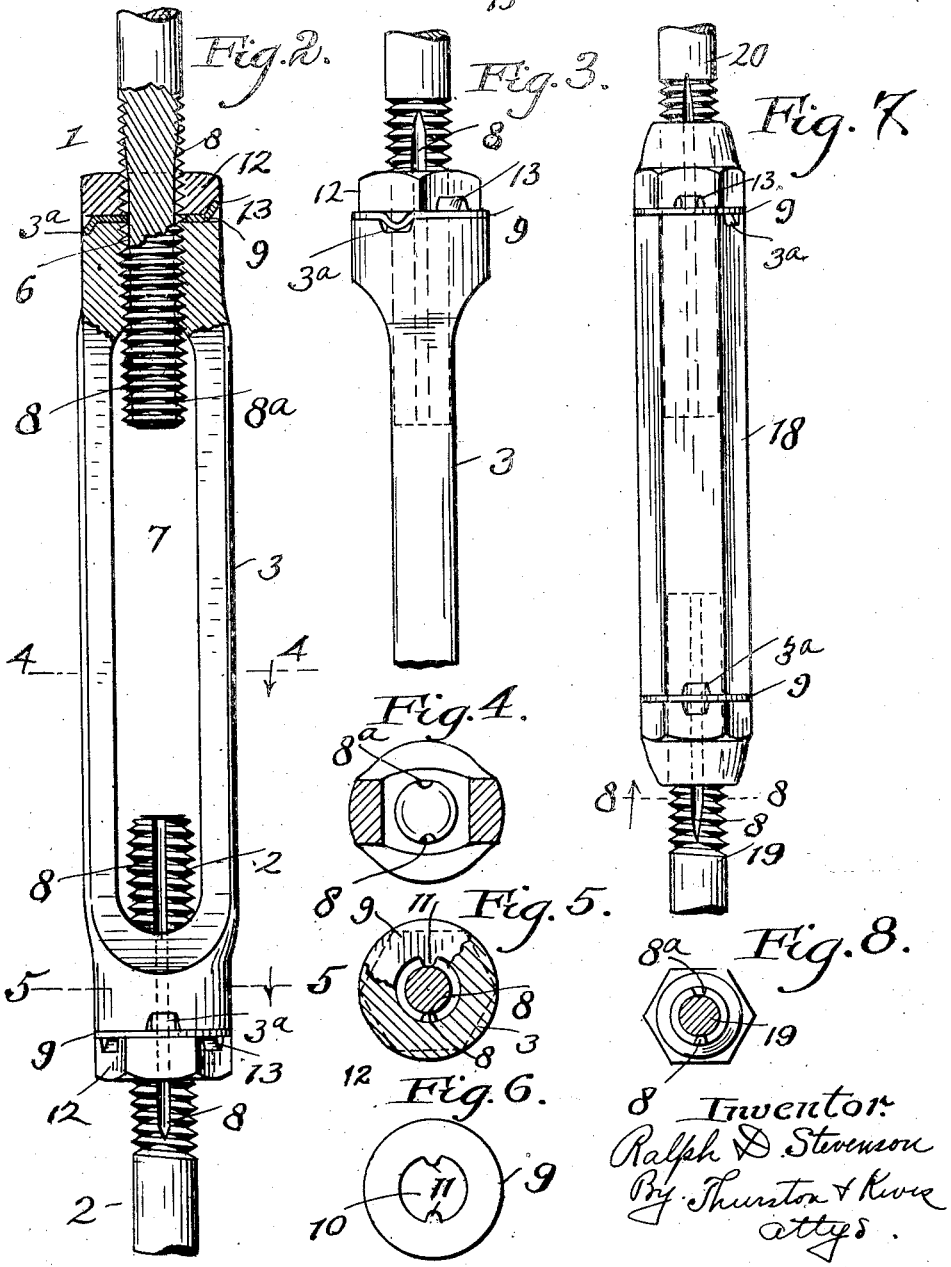

UNITED STATES PATENT OFFICE.

RALPH D. STEVENSON, OF CLEVELAND, OHIO, ASSIGNOR TO THE SAFETY NUT & BOLT COMPANY, OF CLEVELAND, OHIO, A CORPORATION OF DELAWARE.

TURNBUCKLE.

1,374,963.   Specification of Letters Patent.   Patented Apr. 19, 1921.

Application filed March 15, 1918. Serial No. 222,572.

*To all whom it may concern:*

Be it known that I, RALPH D. STEVENSON, a citizen of the United States, residing at Cleveland, in the county of Cuyahoga and State of Ohio, have invented a certain new and useful Improvement in Turnbuckles, of which the following is a full, clear, and exact description.

This invention relates to a turnbuckle constructed in such a manner that the turnbuckle proper may be locked against rotation with respect to the rods which it joins.

Reference should be had to the accompanying drawings forming a part of this specification in which Figure 1 is a top plan view with portions in section, showing a turnbuckle of my invention; Fig. 2 is an elevation of a turnbuckle which in its specific construction differs from that of Fig. 1; Fig. 3 is an elevation showing a portion of a turnbuckle; Fig. 4 is a section upon the line 4—4 of Fig. 2; Fig. 5 is a section upon the line 5—5 of Fig. 2; Fig. 6 is a plan view of a washer; Fig. 7 is an elevation of a modified form of turnbuckle embodying my invention; and Fig. 8 is a section upon the line 8—8 of Fig. 7.

Referring to the drawings, and more particularly to Fig. 2 therein, 1 and 2 indicate the threaded ends of rods or similar structures which are to be joined by means of the turnbuckle 3. The turnbuckle at the ends thereof is provided with threaded openings 6, which are adapted to receive the ends of the threaded rods 1 and 2. As is well known, the function of the turnbuckle 3, is to draw the rods 1 and 2 toward each other by turning of the turnbuckle 3. In the instance shown in Fig. 2, the turnbuckle portion is open, that is to say, there is an opening 7 between the sides thereof, which permits the insertion of a suitable tool by which the turnbuckle may be turned.

So far the turnbuckle described is of a form which is very well known, but in all such turnbuckle construction there is a tendency for the turnbuckle to rotate in a direction which releases the pull upon the rods 1 and 2, and it has been usual construction to endeavor to provide against such turning, by the insertion of a strip of wood or other material through the opening 7, and have the wood bear against some stationary object to thus prevent turning.

In the construction about to be described, the purpose is to provide a means forming a part of the turnbuckle construction which will prevent any such relative turning of the turnbuckle proper with respect to the rods which it joins.

The rods 1 and 2 are provided with grooves 8. These grooves extend longitudinally with respect to the threaded portion of the rods in which they are formed.

As illustrated, there are two such grooves for each rod, 8 and 8ª, these grooves being equally spaced with respect to each other. While two grooves for each rod are shown, this forms no limitation as to the number of grooves that might be employed, as two or more equally spaced grooves may be employed with equal facility. The grooves thus formed are tapering grooves, that is to say, they vary in depth from the threaded end of the rod on which they are formed, to the end of the threaded portion, the depth becoming less as the groove extends toward the end of the threaded portion.

A washer, such as indicated at 9 in Fig. 6, is provided, which washer has a central opening 10, and inwardly extending projections 11, the number and spacing of the projections corresponding with the number of grooves which are formed at the end of the threaded rod. In this instance, two such projections are shown. These projections are adapted to engage with the grooves 8 and 8ª, and the construction is such that the projections engage snugly and with a degree of friction in the groove so that the washer is rather tightly held upon the threaded rod. The opening 10 is of such size as to be slightly larger in diameter than the diameter of the threads so that the threads are not engaged by the sides of the opening 10.

Upon each threaded stem there is a nut 12. These nuts in the inner faces thereof are provided with one or more chucks or depressions 13.

It will be observed that the washer 9, in the assembled construction, lies between the end of the turnbuckle proper and a nut 12.

When such a construction as described, is put into use, the turnbuckle 3 is turned until the desired tension between the rods 1 and 2 is obtained. When this is accomplished the nuts 12 are turned into engagement with their respective washers. Portions of the washer are bent or turned into one or more of the chucks formed in the nut 12 as well as into the chucks 3ª formed at the ends of the turnbuckle proper.

It will be seen that the washer is prevented from rotation with respect to the rod over which it extends because of the fact that the projections 11 of the washer extend into the grooves formed in the rod. The turnbuckle is prevented from turning with respect to the rods because of the engagement of the washer in one or more of the chucks formed in the ends of the turnbuckle. The nut 12 firmly holds the washer against the end of the turnbuckle, and the nut itself is prevented from turning because a portion of the washer is turned into one or more of the chucks formed in the nut. Thus the completed structure as defined, prevents any rotation between the rods 1 and 2 and the turnbuckle 3.

The washer 9 may be made of any suitable material, and of course should have sufficient ductility so that the metal may be readily bent to occupy the chucks in the end of the turnbuckle and in the nut.

The washer may be bent or upset into the chucks of the nut, and the chucks in the end of the turnbuckle, by any suitable tool such as a cape chisel struck with a blow by a hammer. If it be desired to release the turnbuckle, the struck-up portions of the washer may be flattened out by any suitable instrument which permits the turnbuckle to rotate with respect to the rods.

The particular advantage gained by this method of locking the turnbuckle and the rods is that the turnbuckle may be locked at the exact point at which proper tension is secured.

In Fig. 1 a different form of turnbuckle is illustrated, which is particularly adapted for aeroplane construction. This turnbuckle consists of the turnbuckle proper, indicated at 15, and the threaded rods 16 and 17. The threaded rods are provided with heads 16ª and 17ª, which are adapted to be secured to the rods or equivalent construction which are to be joined by means of the turnbuckle.

The body portion 15 is not provided with an opening through the center thereof, as shown in Fig. 2, but is provided with one or more openings such as indicated at 15ª, for the reception of a spanner wrench by which the body portion may be rotated.

The manner of holding the rods 15 and 16 against relative rotation with respect to the turnbuckle proper, is the same as that described with respect to Fig. 3.

In Fig. 7 a modified form of turnbuckle is shown in which the turnbuckle proper, indicated at 18, has the outer surface thereof formed with sides so that a wrench may be applied for the purpose of turning the turnbuckle to draw the rods 19 and 20 toward each other.

While the construction herein described relates to turnbuckle construction, it will be obvious that the intermediate member, such as 3, might be utilized to move the rod members 1 and 2 from each other, in which event the turning of the member 3 would force the members 1 and 2 apart. Such constructions are employed in certain constructions to hold adjacent members spaced from each other, and in such constructions it is of advantage to be able to lock the intermediate member against rotation. An intermediate member such as the member 3, shown in Fig. 2, might be employed for this purpose, and it is equally within the scope of my invention to lock such an intermediate member against rotation, whether the intermediate member be employed to draw the rods 1 and 2 toward each other, or to push them away from each other.

Having described my invention, what I claim is:

1. The combination of two oppositely disposed threaded members an intermediate member having threaded portions which engage with the said threaded members, each of the end portions of the intermediate member being provided with a groove and the said threaded members each being provided with a groove and means engaging the said grooves for locking the said threaded members and the intermediate member against relative rotation.

2. The combination of two oppositely disposed threaded members, an intermediate member having threaded portions at opposite ends thereof which engage with the threaded portions of the first mentioned members, a washer encircling each of the said threaded members, means for retaining the washers, said washer engaging with portions of the threaded member with which it is associated and an adjacent part of the intermediate member whereby the threaded member and intermediate member are locked against relative rotation.

3. The combination with two oppositely disposed threaded members, an intermediate member having threaded portions which engage with the said threaded members, each of said threaded members being provided with a plurality of equally spaced grooves extending longitudinally of the threaded portion thereof, a washer encircling each threaded member, means for retaining the washers, said washer being provided with extensions which engage in the grooves formed in each threaded member, each end of the intermediate member adjacent the washers being provided with one or more depressions into which a portion of the washers may be bent thereby holding the threaded members and the intermediate member against relative rotation.

4. The combination with two oppositely disposed threaded members, each of said threaded members being provided with a plurality of grooves extending longitudinally with respect to the threaded portions of said members, an intermediate member having threaded openings which receive the threaded ends of the said threaded members, the ends of said intermediate member being provided with one or more depressions, a washer encircling each of the threaded members, said washer being provided with extensions which engage in the grooves formed in the said threaded members, and a nut upon each of the said threaded members and in position to be turned against a washer to hold the same against the head of the intermediate member, one or more depressions formed in each of said nuts, portions of each of said washers being adapted to be bent to occupy one or more of the depressions in the head of the intermediate member and in an adjacent nut, whereby the parts are locked against relative rotation.

In testimony whereof I hereunto affix my signature.

RALPH D. STEVENSON.